United States Patent [19]
Bedford

[11] Patent Number: 5,527,046
[45] Date of Patent: Jun. 18, 1996

[54] SEAL ASSEMBLY HAVING RESILIENT LOAD RINGS

[75] Inventor: Billy R. Bedford, Peoria, Ill.

[73] Assignee: Caterpillar Inc., Peoria, Ill.

[21] Appl. No.: 356,950

[22] Filed: Dec. 15, 1994

[51] Int. Cl.$^6$ .................................................... F16J 15/32
[52] U.S. Cl. ........................................ 277/92; 277/81 R
[58] Field of Search ........................... 277/92, 38, 81 R, 277/85, 88, 96.1

[56] References Cited

U.S. PATENT DOCUMENTS

| | | | |
|---|---|---|---|
| 3,125,347 | 3/1964 | Moude | 277/92 |
| 3,180,648 | 4/1965 | Kupfert et al. | 277/92 |
| 3,905,607 | 9/1975 | Maguire et al. | 277/92 |
| 4,066,302 | 1/1978 | Baylor | 305/11 |
| 4,111,436 | 9/1978 | Yazawa | 277/92 |
| 4,189,159 | 2/1980 | Domes | 277/92 |
| 4,256,315 | 3/1981 | Larson et al. | 277/92 |
| 4,262,914 | 4/1981 | Roley | 277/84 |
| 4,306,727 | 12/1981 | Deane et al. | 277/12 |
| 4,311,346 | 1/1982 | Danner | 305/11 |
| 4,330,134 | 5/1982 | Kolinger | 277/42 |
| 4,396,198 | 8/1983 | Metzner et al. | 277/84 |
| 4,429,884 | 2/1984 | Matsumoto | 277/93 |
| 4,548,547 | 10/1985 | Duering | 415/170 |
| 4,568,090 | 2/1986 | Westemeier | 277/84 |
| 4,688,805 | 8/1987 | Crotti et al. | 277/84 |
| 4,695,102 | 9/1987 | Crotti | 305/11 |
| 4,889,349 | 12/1989 | Muller | 277/85 |
| 5,009,519 | 4/1991 | Tatum | 384/94 |

FOREIGN PATENT DOCUMENTS 1361-407A 12/1987 U.S.S.R. .
89/02555 3/1989 WIPO .

*Primary Examiner*—Daniel G. DePumpo
*Attorney, Agent, or Firm*—Claude F. White

[57] ABSTRACT

A seal assembly for sealing the area between a stationary member and a rotatable member includes first and second mating metal seal rings and first and second resilient load rings. The load rings are adapted to apply a load to the metal seal rings. Each load ring is cup-shaped and columnar in cross-sectional configuration and is adapted to flex toward the sealed area and prevent dirt from entering the sealed area and from eroding the load ring.

8 Claims, 3 Drawing Sheets

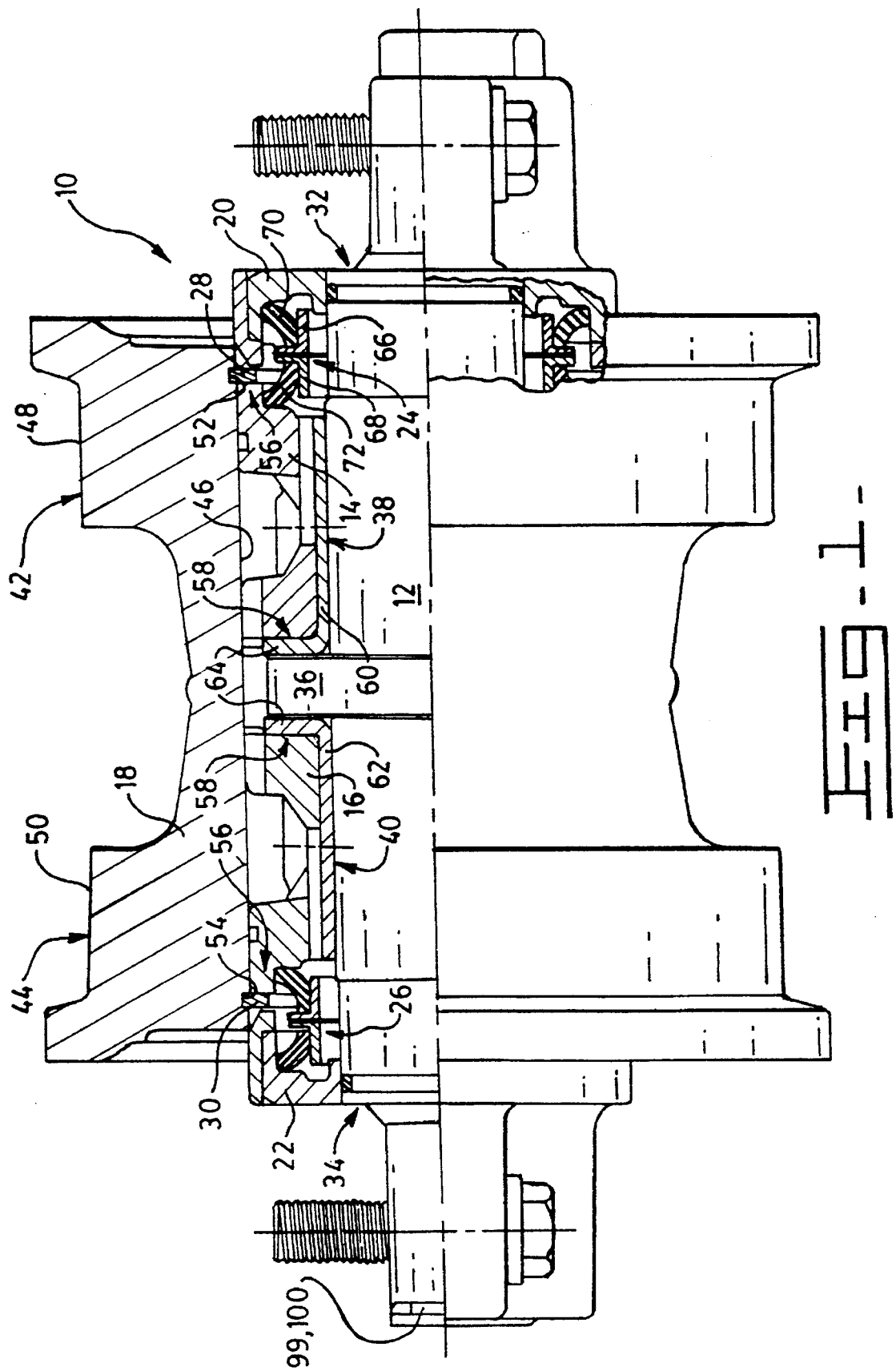

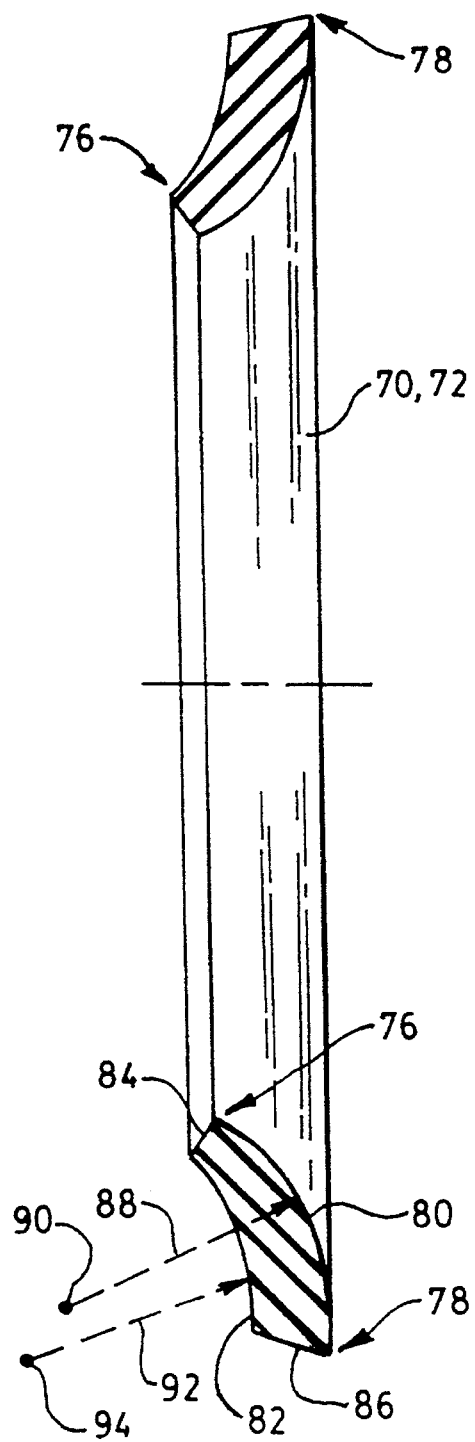
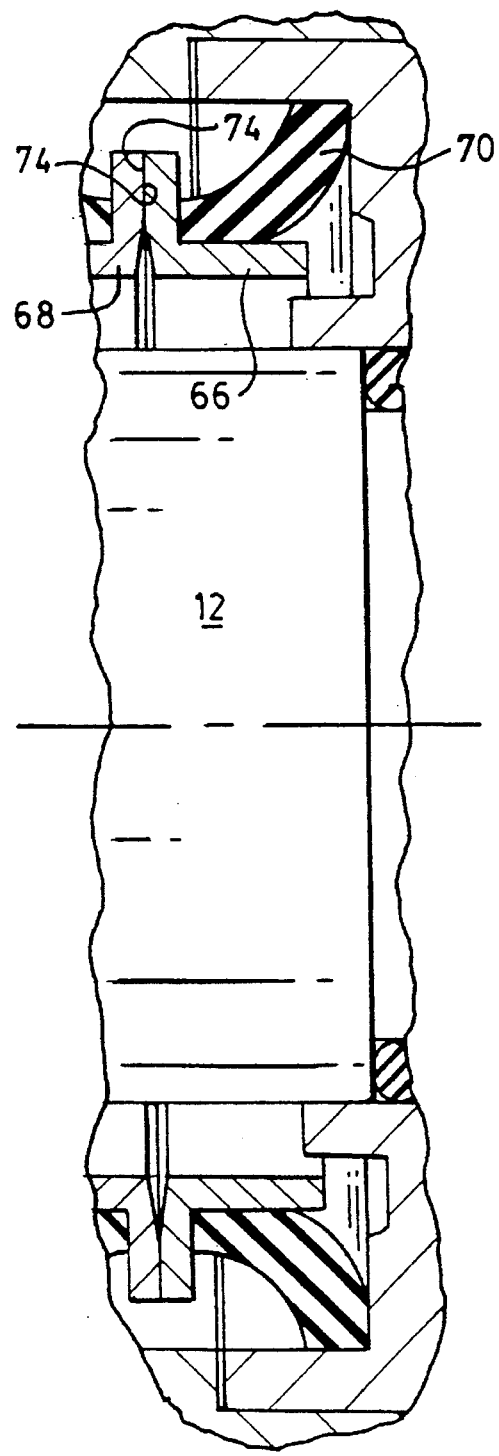

5,527,046

SEAL ASSEMBLY HAVING RESILIENT LOAD RINGS

TECHNICAL FIELD

This invention relates generally to a metal to metal seal assembly and more particularly to a resilient load ring for applying a force to the seal faces of the metal to metal seal.

BACKGROUND ART

The present invention has particular application to track rollers, final drives, and other components of track-type machines. The problem of short bearing life in track rollers and final drive assemblies of track-type machines is one that has continuously plagued the industry for some time. Such machines typically operate in environments that are highly destructive to seals and consequently to the underlying bearings.

One approach to this problem is the type seals disclosed in U.S. Pat. No. 3,180,648 which issued Apr. 27, 1965, to Kupfert et al. and U.S. Pat. No. 3,905,607 which issued Sep. 16, 1975, to Roy L. Maguire et al. both of said patents assigned to the assignee hereof. These type metal seals and subsequent improvements have greatly improved track roller bearing life.

These seals, while satisfactory for the normal operation of the average track-type vehicle are found to have some drawbacks when applied to large high speed track vehicles. For example, when the seal diameter gets large, the surface velocity at the seal face increases, increasing heat and centrifugal force problems.

One problem with prior art metal to metal seal assemblies involves damage to the resilient load rings and subsequent reduction in the force applied to the metal seal rings. The resilient load rings are damaged when dirt and abrasives work under the load rings. When this occurs, the abrasives slip by the load rings and into the sealed and lubricated bearing areas. When the force on the metal seal rings is reduced, dirt and abrasives can enter at the seal face.

Other problems of prior art seals is that the arrangement is such that the effects of dirt and grit on the seal face are increased by the normal expansion and contraction of the seal rings in response to heat generation therein by the friction of normal operation. The expansion of the rings at the seal face causes them to separate near the outer diameter, permitting grit to enter the space between the rings and grind away the face of the seal rings.

The present invention is directed to overcoming one or more of the problems as set forth above.

DISCLOSURE OF THE INVENTION

In one aspect of the invention, a seal assembly includes first and second metal seal rings and first and second resilient load rings which are adapted to apply a loading force to the seal rings. Each resilient load ring has first and second end portions and is cup-shaped and columnar in cross-section, with the cross-sectional shape having a first convex surface, a second concave surface, and first and second straight surfaces joining the convex surface to the concave surface.

The load rings are adapted to flex in a direction toward the convex surface in response to forces urging the first and second end portions toward one another. When the seal assembly is installed in a machine, the convex surface of each load ring is adjacent a sealed interior portion of the machine and the concave surface of each load ring is adjacent the unsealed exterior portion of the machine. As the load rings flex and roll, they roll on clean sealed areas of the machine and seal assembly so no dirt or other foreign material can get under the load ring to erode or damage the load rings.

BRIEF DESCRIPTION OF THE DRAWINGS

FIG. 1 is a diagrammatic view, partially in section, of a track roller assembly incorporating the subject invention;

FIG. 2 is an enlarged diagrammatic view, partially in section, of a portion of one of the seal assemblies of the present invention; and FIG. 3 is an enlarged diagrammatic sectional view of a load ring of the present invention.

BEST MODE FOR CARRYING OUT THE INVENTION

Figure 4:
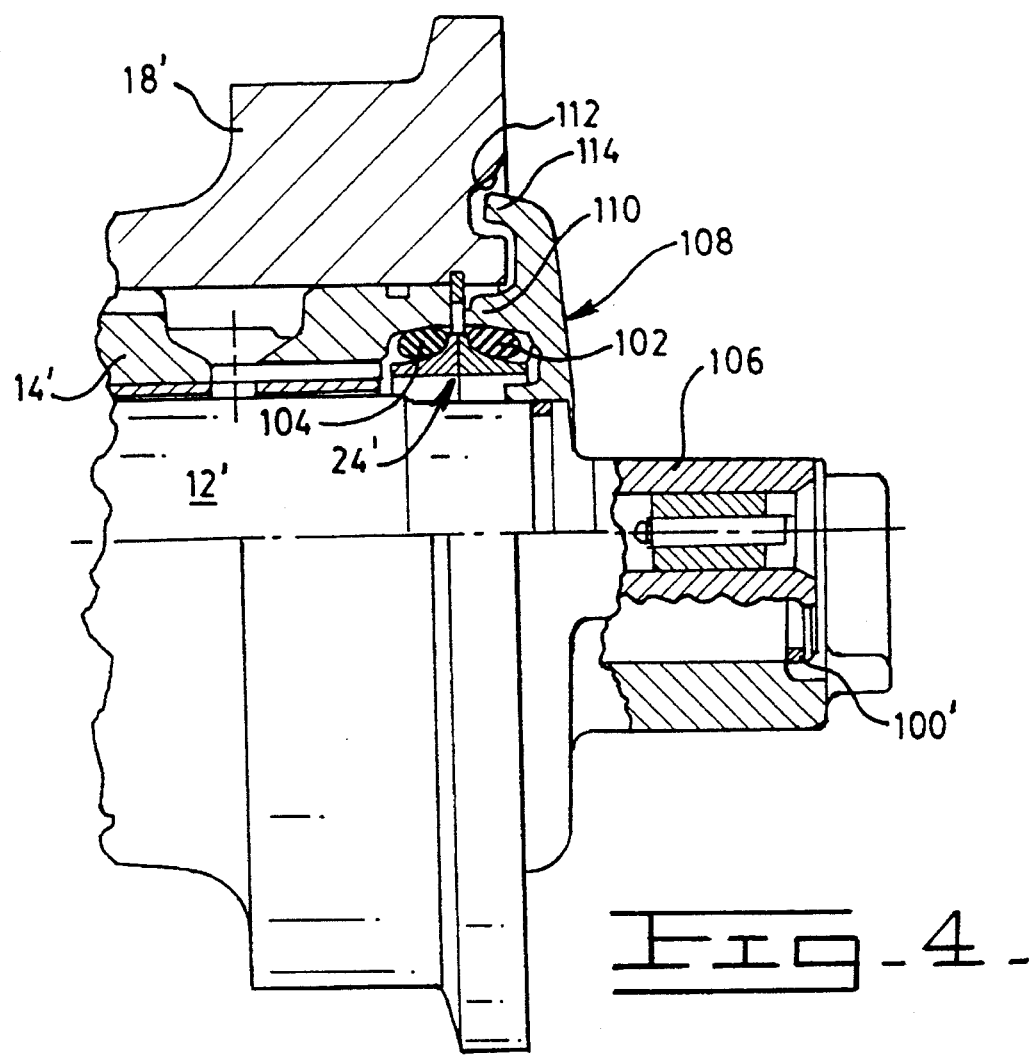
FIG. 4 is a diagrammatic view, partially in section, of a portion of an alternate embodiment of a track roller incorporating the subject invention.
Figure 5:
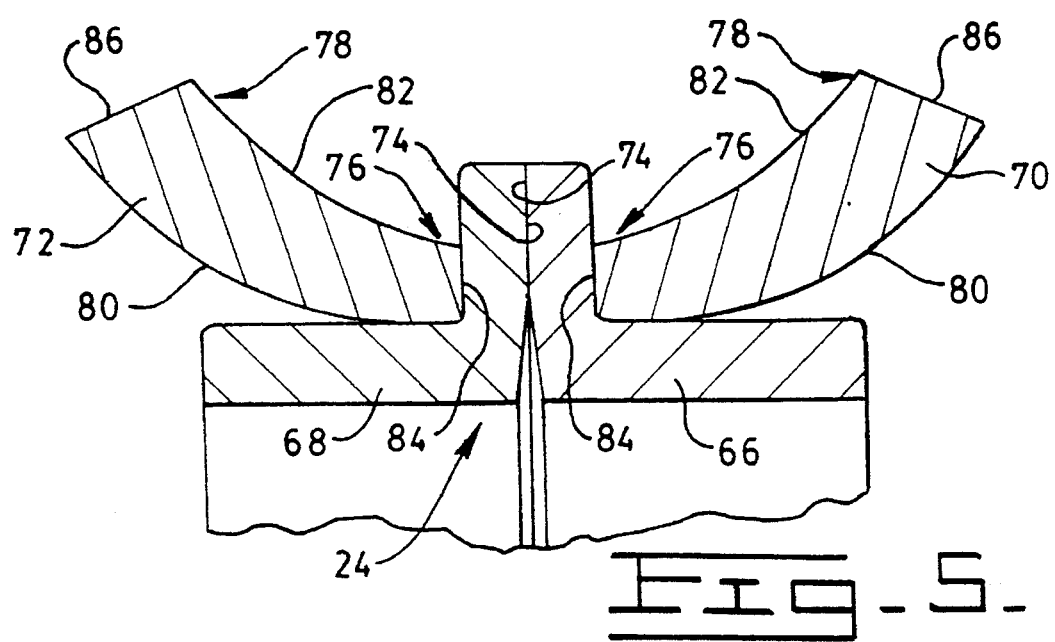
FIG. 5 is a diagrammatic sectional view, on an enlarged scale, of the upper portion of a seal assembly of the present invention.

With reference to the drawings, a track roller assembly 10 for guiding the track (not shown) of a track-type machine (not shown) includes a central supporting shaft 12, first and second bushings 14, 16, a roller shell 18, first and second end caps 20, 22, first and second seal assemblies 24, 26, and first and second split metal retaining rings 28, 30 which secure the roller shell 18 in a fixed position with respect to the bushings 14, 16 and the shaft 12. The first and second end caps 20, 22 are preferably pressfitted to the shaft 12 and the first and second bushings 14, 16 are preferably pressfitted to the roller shell 18. The supporting shaft 12 has first and second end portions 32, 34, a central flange portion 36, and first and second bushing supporting portions 38, 40 which are positioned respectively between the central flange portion 36 and the first and second end portions 32, 34. The first and second bushings 14, 16 are positioned on respective first and second bushing supporting portions 38, 40 of the supporting shaft 12.

The roller shell 18 has first and second tread portions 42, 44 and an internal through bore 46 with the supporting shaft 12 and bushings 14, 16 being adapted to fit within the bore 46. The tread portions 42, 44 have respective contact surfaces 48, 50 which are adapted to contact the endless track (not shown) of the track-type machine (not shown). During operation of the machine and motion of the endless track, and over extended periods of time, the contact surfaces 48, 50 erode from the contact with the endless track.

The first and second end caps 20, 22 are positioned on respective first and second shaft end portions 32, 34 and substantially close off each end of the internal bore 46. The first and second seal assemblies 24, 26 are positioned between respective first and second bushings 14, 16 and first and second end caps 20, 22. The seal assemblies 24, 26 prevent leakage of lubricating fluid out of the internal bore 46 and prevent dirt and other foreign material from entering the internal bore 46.

The track roller shell 18 has first and second circular grooves 52, 54 formed in the internal bore 46 and the split retaining rings 28, 30 are adapted to fit within respective grooves 52, 54. Each of the bushings 14, 16 has first and second end portions 56, 58 with the first end portions 56 being adapted to contact one of the split rings 28, 30 and the second end portions 58 being adapted to contact the central flange portion 36 of the supporting shaft 12. The track roller assembly 10 further includes first and second bearing sleeves 60, 62, with each sleeve 60, 62 having a radially extending flange portion 64. The bearing sleeves 60, 62 are positioned between the respective first and second bushing supporting portions 38, 40 and the first and second bushings 14, 16. The flange portion 64 of each sleeve 60, 62 is positioned between the central flange portion 36 of the shaft 12 and the second end portion 58 of one of the bushings 14, 16.

Each of the seal assemblies 24, 26 includes first and second metal seal rings 66, 68 and first and second resilient load rings 70, 72. The seal rings 66, 68 are substantially similar with each seal ring 66, 68 having a seal face 74 which mates with a like seal face 74 on a mating seal ring 66, 68 in the assembled condition of the seal assembly 24, 26. The resilient load rings 70, 72 are also substantially similar and are adapted to apply a force to the seal rings 66, 68 and the seal faces 74.

With particular reference to FIGS. 2 and 3, each of the resilient load rings 70, 72 is cup-shaped and is columnar in cross-section. The cross-sectional shape of each load ring 70, 72 includes first and second end portions 76, 78 and defines a first curved convex surface 80, an opposed second concave surface 82, a first straight surface 84 joining the first convex surface 80 to the second concave surface 82 at the first end portion 76, and a second straight surface 86 joining the first convex surface 80 to the second concave surface 82 at the second end portion 78. The length of the second straight surface 86 is substantially greater than the length of said first straight surface 84. The first convex surface 80 is defined by a first radius 88 having a first centerpoint 90, and the second concave surface 82 is defined by a second radius 92 having a second centerpoint 94. The first centerpoint 90 is spaced from the second centerpoint 94 and the second radius 92 is greater than the first radius 88.

In the assembled condition of the seal assemblies 24, 26, the first end portion 76 of each resilient load ring 70, 72 is adapted to contact one of the seal rings 66, 68 and the second end portion 78 of each resilient load ring is adapted to contact one of the bushings 14, 16 or one of the end caps 20, 22. In the assembled condition of the seal assemblies 24, 26, wherein the first end portion 76 of the load rings 70, 72 is urged toward the second end portion 78, the load rings 70, 72 are adapted to flex in a direction toward the convex surface 80, which is toward the sealed interior 96 of the roller assembly 10 and away from the exterior environment 98. The load rings 70, 72 will also flex toward the convex surface in response to forces tending to urge the first and second end portions 76, 78 toward one another. In view of this, the convex surface 80 never rolls on a contaminated or dirt covered surface and the life of the load rings 70, 72 is extended.

With particular reference to FIG. 4, an alternate embodiment of a track roller assembly is shown which is similar to the previously described embodiment. In this alternate embodiment, similar elements are indicated by the same reference numerals with a prime symbol. This embodiment incorporates a seal assembly 24' having third and fourth seal rings 66',68' and third and fourth resilient load rings 102, 104. The load rings 102, 104 are in the form of a torus in the uncompressed state, and somewhat flattened in the installed position. As in the previous embodiment, the bushing 14' and the roller shell 18' are held together by a split retaining ring 28'. The end cap 106 is slipfitted to the supporting shaft 12' and is held to the shaft 12' by a split lock ring 100'. The end cap 106 includes a flange portion 108 which has a loading portion 110 for applying a load to the resilient load ring 102. The roller shell 18' has a recessed portion 112 which accommodates an extension 114 of the flange portion 108.

INDUSTRIAL APPLICABILITY

With reference to the drawings, and the previous detailed description, the subject track roller assembly 10 is particularly useful for guiding the endless track chain of a track-type machine and for increasing the useful life of the roller assembly 10. The life of the roller assembly 10 is increased in view of additional strength of the roller shell 18 and in view of additional wear material in the tread portions 42, 44. The resilient load rings 70, 72 of the seal assemblies also contribute to increased wear life of the roller assembly 10 by excluding dirt from the interior of the roller assembly 10. The resilient load rings 70, 72 are not eroded by dirt and debris because during compression the load rings 70, 72 do not roll on contaminated surfaces.

Prior art roller assemblies generally utilize roller shells having threaded holes in the body of the roller shells, immediately below the tread portions, which receive threaded fasteners to secure the bushings and/or other components to the roller shells. Such threaded holes in the body of the roller shells reduce the strength of the shells and reduce the amount of useful wear material of the tread portions. The subject track roller assembly 10 eliminates such threaded holes and utilize split retaining rings 28, 30 to secure the bushings 14, 16 and the roller shell 18 together.

Other aspects, objects and advantages of this invention can be obtained from a study of the drawings, the disclosure and the appended claims.

I claim:

1. A seal assembly, comprising:

first and second metal seal rings, each seal ring having a seal face adapted to mate with a seal face of a mating seal ring; and first and second resilient load rings, said load rings being adapted to apply a force to said seal rings and to said seal faces, each load ring, in a free and uncompressed state, being cup-shaped and columnar in cross-section, said cross-sectional shape having first and second end portions and defining a first convex surface, an opposed second concave surface, a first straight surface joining the first convex surface to the second concave surface at the first end portion, and a second straight surface joining the first convex surface to the second concave surface at the second end portion, said first straight surface having a first length and said second straight surface having a second length, said second length being substantially greater than said first length.

2. A seal assembly, as set forth in claim 1, wherein said first end portion of each load ring is adapted to flex in a direction toward said convex surface in response to forces urging said first and second end portions toward one another.

3. A seal assembly, as set forth in claim 1, wherein said first convex surface is defined by a first radius and said second concave surface is defined by a second radius, said second radius being greater than said first radius.

4. A seal assembly, as set forth in claim 3, wherein said first radius has a first centerpoint and said second radius has a second centerpoint which is spaced from said first centerpoint.

5. A resilient load ring for a seal assembly, comprising:

a cup-shaped ring of resilient material having, in a free and uncompressed state, a columnar shape in cross-section, said cross-sectional shape having first and second end portions, a first convex surface, an opposed second concave surface, a first straight surface joining the first convex surface to the second concave surface at the first end portion, and a second straight surface joining the first convex surface to the second concave surface at the second end portion, said first convex surface being non-concentric to said second concave surface, and said first straight surface having a first length and said second straight surface having a second length, said second length being substantially greater than said first length.

6. A resilient load ring, as set forth in claim 5, wherein said first convex surface is defined by a first radius having a first centerpoint and said second concave surface is defined by a second radius having a second centerpoint, said second centerpoint being spaced from said first centerpoint.

7. A resilient load ring, as set forth in claim 6, wherein said second radius is greater than said first radius.

8. A seal assembly comprising:

first and second metal seal rings, each seal ring having a seal face adapted to mate with a seal face of a mating seal ring; and first and second resilient load rings, said load rings being adapted to apply a force to said seal rings and to said seal faces, each load ring being cup-shaped and columnar in cross-section, said cross-sectional shape having, in a free and uncompressed state, first and second end portions and defining a first convex surface, an opposed second concave surface, a first straight surface joining the first convex surface to the second concave surface at the first end portion, and a second straight surface joining the first convex surface to the second concave surface at the second end portion, said first convex surface having a first radius of curvature and said second concave surface having a second radius of curvature, said first radius of curvature being greater than said second radius of curvature; and each seal ring having, in cross-section, first and second flange portions with said second flange portion joining said first flange portion to define an L-shape seat, said seal face being formed on said first flange, and one of said load rings being positioned on each of said L-shaped seats with said first straight surface in contact with said first flange portion and said first convex surface being in contact with said second flange portion.

* * * * *